United States Patent [19]
Osman et al.

[11] Patent Number: 5,412,045
[45] Date of Patent: May 2, 1995

[54] PREPARATION OF HIGH CIS-1,4-POLYBUTADIENE WITH REDUCED GEL

[75] Inventors: Akhtar Osman; Thomas F. Knauf, both of Sarnia, Canada

[73] Assignee: Polysar Rubber Corporation, Sarnia, Canada

[21] Appl. No.: 308,013

[22] Filed: Sep. 16, 1994

[51] Int. Cl.$^6$ ............................ C08F 4/14; C08F 4/70; C08F 136/06
[52] U.S. Cl. .................................. 526/133; 526/151; 526/340.4; 526/335
[58] Field of Search ............ 526/133, 151, 340.4

[56] References Cited

U.S. PATENT DOCUMENTS

| | | | |
|---|---|---|---|
| 3,170,907 | 2/1965 | Ueda et al. | 526/133 |
| 3,676,411 | 7/1972 | Throckmorton et al. | 526/133 X |
| 3,985,941 | 10/1976 | Pierson et al. | 526/133 |
| 4,020,255 | 4/1977 | Schoneman et al. | 526/133 |
| 4,522,988 | 6/1985 | Kang et al. | 526/133 |

FOREIGN PATENT DOCUMENTS

| | | |
|---|---|---|
| 0093075 | 11/1983 | European Pat. Off. |
| 906334 | 9/1962 | United Kingdom |

*Primary Examiner*—Fred Teskin
*Attorney, Agent, or Firm*—Joseph C. Gil; Godfried R. Akorli

[57] ABSTRACT

There is provided a process for the preparation of a high cis-1,4-polybutadiene with a reduced microgel content wherein a novel catalyst system consisting of (1) a nickel salt of a carboxylic acid, (2) a mixture of triethyl aluminum and an organoaluminum compound having the formula $R_3Al$, said mixture having an average composition $Et_{3-x}R_xAl$ wherein Et is an ethyl group, x is a numeral from 0.1 to 2.9 and R is an alkyl group having 8 to 12 carbon atoms, and (3) a boron trifluoride etherate is used to polymerize 1,3-butadiene in an inert hydrocarbon.

11 Claims, No Drawings

PREPARATION OF HIGH CIS-1,4-POLYBUTADIENE WITH REDUCED GEL

FIELD OF THE INVENTION his invention is directed to a method for polymerizing butadiene to form polymers with a greater than 96 percent cis-1,4-configuration. More specifically the invention is related to an improved catalyst system for producing cis-1,4-polybutadiene with a reduction in microgel content.

BACKGROUND OF THE INVENTION

There are prior art methods for the preparation of polybutadienes wherein at least 90 percent of the butadiene units are present in the cis-1,4-configuration and a number of these methods utilize fluoride-bearing compounds with nickel compounds and aluminum compounds as the catalyst system. However, in order to make a stereoregular polymer that is suitable for plastics grade usage, that is, can be used as the impact-imparting component of impact grades of polystyrene, it is important that the polymers have a minimal gel content in addition to being produced with a fairly rapid rate of polymerization since it is economically unfeasible to have a very long polymerization time in a commercial operation.

DESCRIPTION OF THE PRIOR ART

One of the prior art methods, British Patent Number 906,334 (Bridgestone Tire, Kabushiki Kaisha) describes a process for producing a polybutadiene having a high cis-1,4-content by polymerizing at a temperature between about −30° C. and about 150° C. in the presence of a catalyst system obtained by mixing three components consisting of (A) an organic complex compound of a metal selected from nickel and cobalt such as acetylacetonate nickel or nickel tetracarbonyl, (B) a compound selected from chlorides and oxychlorides of the metals belonging to groups IVA and VA of the Periodic Table and boron trihalides and their complexes, such as titanium tetrachloride or boron trifluoride etherate, and (C) a substance selected from organo metallic compounds of the metals of groups I, II and III of the Periodic Table, an example being triethyl aluminum.

U.S. Pat. No. 3,985,941 (issued Oct. 12, 1976 to Goodyear Tire and Rubber Company) describes a method for producing polybutadiene with a high (greater than 90 percent) content of butadiene units in the cis-1,4-configuration that comprises contacting butadiene with a catalyst consisting essentially of (1) an organoaluminum selected from the group consisting of triisobutyl aluminum and tri-n-butyl aluminum, (2) an organonickel compound and (3) a fluorinated mixture of hydrogen fluoride etherate where the molar ratio of fluoride to aluminum ranges upward from 3:1 to 20:1 and the mole percent of hydrogen fluoride with respect to the total fluoride ranges from about 5 percent to 50 percent. Through the use of this catalyst system it is possible to control the polymerization rate and the molecular weight.

A further process for producing a high cis-1,3-polybutadiene is disclosed in U.S. Pat. No. 4,020,255 (issued Apr. 26, 1977 to Goodyear Tire and Rubber Company) and comprises continuously polymerizing butadiene in an inert non-aromatic solvent employing as the catalyst system a mixture comprising (A) at least one trialkyl aluminum wherein the alkyl group contains from 2 to 8 carbon atoms, (B) at least one nickel salt of carboxylic acids and (C) at least one boron trifluoride complex of ethers.

European Patent Application 0 093 075 (published Nov. 2, 1983 Goodyear Tire and Rubber Company) discloses a polymerization process for the regulation of the molecular weight of a high cis-1,4-polybutadiene that involves polymerizing 1,3-butadiene under solution polymerization conditions at a temperature from about 68° C. to about 107° C. employing as a catalyst (1) at least one organoaluminum compound, (2) at least one organonickel compound selected from the group consisting of nickel salts of carboxylic acids, organic complex compounds of nickel and nickel tetracarbonyl, and (3) hydrogen fluoride or a hydrogen fluoride complex prepared by complexing hydrogen fluoride with a complexing compound. By using lower nickel compound levels and lower temperatures the amount of branching and microgel content in the polybutadiene can be controlled.

SUMMARY OF THE INVENTION

It is an objective of this invention to provide a process for the production of a high molecular weight rubbery polybutadiene with a reduced microgel content having more than 96 percent of the butadiene units present in the cis-1,4-configuration.

Thus in accordance with the present invention there is provided a process for the production of a high molecular weight polybutadiene with reduced microgel content having more than 96 percent of the butadiene units present in the cis-1,4-configuration, which process comprises the steps of:

(A) polymerizing 1,3-butadiene in a polymerization medium comprising an inert hydrocarbon at a temperature of from about 0° C. to about 120° C. in the presence of a catalyst system dissolved in said polymerization medium, said catalyst system comprising (1) a nickel salt of a carboxylic acid, (2) a mixture of triethyl aluminum and an organoaluminum compound having the formula R3Al, said mixture having an average composition $Et_{3-x}R_xAl$ wherein Et is an ethyl group, R is an alkyl group having from 8 to 12 carbon atoms and x is a numeral of from about 0.1 to about 2.9 and (3) a boron trifluoride etherate wherein the molar ratio of said nickel salt to said mixture is from about 1:1 to about 1:20 and the molar ratio of said boron trifluoride etherate to said mixture is from about 1:0.25 to about 1:2, (B) continuing the polymerization thus initiated to the monomer conversion desired and (C) thereafter deactivating the polymerization and recovering the polybutadiene.

DETAILED DESCRIPTION OF THE INVENTION

Now, in accordance with the present invention it has been found that a hydrocarbon soluble catalyst system prepared by combining three essential compounds namely (1) a nickel salt of a carboxylic acid, (2) a mixture of triethyl aluminum and an organoaluminum compound having the formula R3Al, said mixture having an average composition $Et_{3-x}R_xAl$ wherein Et is an ethyl group, R is an alkyl group having from 8 to 12 carbon atoms and x is a numeral of from about 0.1 to about 2.9 and (3) a boron trifluoride etherate when used in the polymerization of 1,3-butadiene affords a polybutadiene with a reduced microgel content having more than 96 percent of the butadiene units present in the cis-1,4-structure.

As has been indicated, the catalyst system employed in the practice of this invention contains three components, the first component being a nickel salt of a carboxylic acid. Representative of such compounds are nickel benzoate, nickel acetate, nickel naphthenate, nickel octanoate, nickel palmitate and nickel stearate. Of these compounds, it is preferred to employ nickel octanoate.

The second catalyst component employed in the practice of this invention is a mixture of triethyl aluminum and an organoaluminum compound having the formula $R_3Al$, said mixture having an average composition $Et_{3-x}R_xAl$ wherein Et is an ethyl group, R is an alkyl group having from 8 to 12 carbon atoms and x is a numeral of from about 0.1 to about 2.9. In the context of the definition of the mixture it is to be understood that the word numeral refers not only to whole numbers but also to fractions of whole numbers. The alkyl group R is represented by groups such as n-octyl, isooctyl, n-nonyl, n-decyl, un-decyl and dodecyl. Preferably the mixture used in the practice of this invention has the average composition $Et_{3-x}R_xAl$ wherein Et is an ethyl group, R is an alkyl group having from 8 to 12 carbon atoms, aforementioned examples of the alkyl group R being representative, and x is a numeral of from about 0.8 to about 2.8. More preferably the mixture has the average composition $Et_{3-x}R_xAl$ wherein Et is an ethyl group, R is an alkyl group having 8 carbon atoms, that is R is an n-octyl or an isooctyl group and x is a numeral of from about 1 to about 2.

Preparation of the organoaluminum compound is accomplished by mixing together solutions of triethyl aluminum and a trialkyl aluminum having the required alkyl group R in suitable hydrocarbon solvents in the appropriate ratio to afford the desired organoaluminum compound.

In the practice of the process of the present invention it has been found that when the mixture contains both the sterically larger trioctyl aluminum and the sterically smaller triethyl aluminum, there is a reduction in the microgel content in the cis-1,4-polybutadiene produced in the process relative to when either triethyl aluminum or trioctyl aluminum is used alone.

The third catalyst component of this invention is a boron trifluoride complex of an ether. When these boron trifluoride ether complexes are not commercially available, they may be readily formed by directly contacting boron trifluoride gas with the ether to be used as the complexing agent in about equal molar amounts. This contact is accomplished by reacting the desired amounts of boron trifluoride and the ether compound to form the boron trifluoride etherate. This is more conveniently performed and may be carried out in a medium of an inert organic diluent.

Representative examples of the boron trifluoride etherates suitable for use in this invention are boron trifluoride diethyl etherate, boron trifluoride dipropyl etherate, boron trifluoride diisopropyl etherate, boron trifluoride di-n-butyl etherate, boron trifluoride diisobutyl etherate, boron trifluoride di-n-pentyl etherate, boron trifluoride diisopentyl etherate, boron trifluoride di-n-hexyl etherate and boron trifluoride diisohexyl etherate. Preferably the boron trifluoride etherate employed in the practice of this invention is boron trifluoride diethyl etherate.

The molar ratio of the nickel salt of a carboxylic acid to the mixture of triethyl aluminum and an organoaluminum compound having the formula $R_3Al$, said mixture having an average composition $Et_{3-x}R_xAl$ where Et is an ethyl group, R is an alkyl group having from 8 to 12 carbon atoms and x is a numeral of from about 0.1 to about 2.9, is from about 1:1 to about 1:20, preferably of from about 1:2 to about 1:12.

The molar ratio of the boron trifluoride etherate to the mixture of triethyl aluminum and an organoaluminum compound is from about 1:0.25 to about 1:2.

The process of the present invention is carried out in a polymerization medium containing an inert hydrocarbon which is a solvent at least for the monomer, 1,3-butadiene, and the catalyst system. Suitable inert hydrocarbons for use as the polymerization medium include aliphatic, cycloaliphatic and aromatic hydrocarbons and mixtures thereof. More specifically suitable hydrocarbons are those selected from the group consisting of $C_4$ to $C_8$ aliphatic hydrocarbons, $C_5$ to $C_{10}$ cycloaliphatic hydrocarbons, $C_6$ to $C_9$ aromatic hydrocarbons and mixtures thereof. Illustrative nonlimiting examples of the aforementioned hydrocarbons include butane, pentane, hexane, heptane, cyclopentane, cyclohexane, benzene, toluene and xylene. Preferably the process of the present invention is carried out in a polymerization medium that does not contain an aromatic hydrocarbon, that is the process is carried out in hydrocarbons selected from the group consisting of $C_4$ to $C_8$ aliphatic hydrocarbons and $C_5$ to $C_{10}$ cycloaliphatic hydrocarbons and mixtures thereof. More preferably the inert hydrocarbon for use as the polymerization medium is selected from hexane, heptane, cyclopentane and cyclohexane.

The proportion or concentration of 1,3-butadiene in the polymerization medium can vary somewhat depending on the particular solvent or diluent medium employed. In most solvents in which both the 1,3-butadiene and the product-polymer are completely soluble, from about 12 to 35 percent by weight of the 1,3-butadiene, based on the total weight of the solution can be employed with the production of a flowable cement.

Preparation of the catalyst system may be carried out by mixing solutions of the components (1), (2) and (3) in any desired sequence in a suitable inert solvent with stirring or, preferably by the addition and mixing of catalyst components (1) and (2) with the polymerization reaction mixture followed by the addition of catalyst component (3). If desired components (1) and (2) may be mixed together before they are added to the polymerization mixture. It is preferable that the 1,3-butadiene which is to be polymerized is added prior to the catalyst components for when the addition of the catalyst components and the 1,3-butadiene is in the reverse order, the product cis-1,4-polybutadiene may contain black specks arising from the formation of zero valency nickel.

The temperature at which the process of the present invention can be carried out can vary, temperatures being in the range of from about 0° C. to about 120° C., the lower temperature limit being dictated more by the freezing point of the reaction medium rather than by the catalyst activity. Normally the process of the present invention is conducted within a temperature range of from about 40° C. to about 90° C.

In accordance with the process of this invention, a high molecular weight polybutadiene having more than 96 percent of the butadiene units present in the cis-1,4-configuration is produced with a reduction in microgel content by polymerizing, in a reaction vessel provided with agitation, 1,3-butadiene dissolved in a polymerization medium comprising an inert hydrocarbon solvent in the presence of a catalyst system comprising (1) a nickel salt of a carboxylic acid (2) a mixture of triethyl aluminum and an organoaluminum compound having the formula $R_3Al$, said mixture having an average composition $Et_{3-x}R_xAl$ wherein Et is an ethyl group, R is an alkyl group having from 8 to 12 carbon atoms and x is a numeral of from about 0.1 to about 2.9 and (3) a boron trifluoride etherate.

The polymerization may be carried out as a batchwise polymerization or as a continuous process polymerization, the procedure of continuous process polymerization being preferred for commercial production with 1,3-butadiene and the catalyst system being continuously supplied to the reaction vessels.

Without limiting in any way the scope of the invention, the process of the present invention may consist of dissolution of 1,3-butadiene in at least one inert hydrocarbon that comprises the polymerization medium. To this solution, there is then added a solution of the organoaluminum followed by a solution of the nickel salt of carboxylic acid and then a solution of the boron trifluoride etherate. After thorough agitation and a period of aging (if desired) the mixture in solution can be conveniently introduced into one or a series of reaction vessels where the polymerization is to take place. After the polymerization has reached the desired degree of conversion, the reaction mixture is treated with an agent that deactivates the catalyst, such agents being selected from water, alcohol and the like. The polymer may be precipitated by the addition of alcohol or alcohol solvent mixtures that both destroy the catalyst and precipitate the polymer as a solid crumb which may be further washed with water or alcohol and subsequently dried by methods well known in the art. In a commercial process the polymer may be recovered by contacting the polymer solution or slurry with copious amounts of hot water and/or steam thereby flashing off the inert organic solvent and any unreacted monomers. The polymer-hot water slurry may then be passed through a tunnel dryer or drying extruder.

In the examples which illustrate the practice of this invention, the analytical techniques below were employed for the analysis of the high cis-1,4-polybutadienes produced.

Molecular weight determinations were made by Gel Permeation Chromatography (GPC) using a Waters gel permeation chromatography equipped with a differential refractive index (DRI) detector, the instrument being calibrated with polystyrene standards having a narrow molecular weight distribution. The system was operated at ambient temperature using three linear columns packed with Styrogel ® and as the mobile phase, tetrahydrofuran.

The weight percentages of the cis-1,4- the trans-1,4- and the vinyl-1,2-structures in the polybutadiene products were determined by Fourier Transform Infrared (FTIR) Spectroscopy using polymeric films cast from solution on to potassium bromide plates. The areas of the absorbance peaks at 995 $cm^{-1}$, 968 $cm^{-1}$, 912 $cm^{-1}$, 895 $cm^{-1}$ and 740 $cm^{-1}$ were integrated and the weight percentages of the cis-1,4-, trans-1,4- and vinyl-1,2-structures were then determined from empirically derived relationships.

The dilute solution viscosity was obtained according to a modified version of ASTM method D-3616 wherein the amount of sample used in the preparation of the polymeric solution was 0.3000±0.0002 grams and the flow times of the polymeric solution and the solvent were determined at a temperature of 30°±0.02° C.

The wet gel and dry gel content of the high cis-1,4-polybutadienes produced in the process of this invention were determined using the following procedure. A known weight of the polymer sample is dissolved in styrene, any gel present in the polymer being swollen by styrene solvent absorption. The wet (swollen) gel is then isolated via filtration through a metallic screen, weighed and the parts per million of wet gel calculated. The screen containing the wet gel is then placed in a vacuum oven to drive off any excess styrene, after which time the screen and remaining dry gel are then cooled, weighed and the parts per million of dry gel calculated.

1,3-Butadiene obtained from Union Carbide and Phillips pure grade cyclohexane were purified by passage through a column packed with 4Å molecular sieves, followed by passage through a column packed with 13X molecular sieves. Nickel octanoate obtained from Pfaltz and Bauer and the trialkyl aluminums obtained from either Ethyl Corporation or Akzo (Texas Alkyls Division) were used as received.

The following examples are intended to illustrate specific embodiments of the invention and are not intended to limited the scope of the invention.

EXAMPLE 1

This example demonstrates three polymerizations of 1,3-butadiene using a catalyst system wherein a 1 molar solution of triethyl aluminum in hexane has been mixed with a 25.3 weight percent solution of trioctyl aluminum in heptane in varying proportions thereby affording three different compositions of the mixture defined herein together with nickel octanoate and boron trifluoride diethyl etherate.

Solutions of the mixture of triethyl aluminum and the organoaluminum compound for use in the polymerizations were prepared in the following manner.

A 1.0 molar solution of triethyl aluminum in hexane (90 ml, 0.09 mol) was mixed with a 25.3 weight percent solution of trioctyl aluminum in heptane (14.5 g, 0.01 mol) under an atmosphere of argon to give a solution of a mixture having an average composition of $Et_{2.7}OctAl$.

A 1.0 molar solution of triethyl aluminum in hexane (100 ml, 0.1 mol) was mixed with a 25.3 weight percent solution of trioctyl aluminum in heptane (72.5 g, 0.05 mol) under an atmosphere of argon to give a solution of a mixture having an average composition of $Et_2OctAl$.

A 1.0 molar solution of triethyl aluminum in hexane (50 ml, 0.05 mol) was mixed with a 25.3 weight percent solution of trioctyl aluminum in heptane (145 g, 0.10 mol) under an atmosphere of argon to give a solution of a mixture having an average composition of $EtOct_2Al$.

A series of polymerizations of 1,3-butadiene in a solvent system of cyclohexane under an atmosphere of argon utilizing the three component catalyst system made up of (1) nickel octanoate, (2) various mixtures of triethyl aluminum and trioctyl aluminum and (3) boron trifluoride diethyl etherate were carried out in bottles. In each experiment a 1 liter glass bottle capped with a two hole crown cap sealed with a fluorinated rubber gasket was charged with cyclohexane (280 g) and 1,3-butadiene (84.0 g, 1.56 mol). To this solution there was added a solution of $5.0 \times 10^{-3}$ mols of a mixture of triethyl aluminum and trioctyl aluminum in hexane/heptane, then a 10 weight percent solution of nickel octanoate in hexane (4.8 g, $1.4 \times 10^{-3}$ mol) and finally boron trifluoride diethyl etherate (0.6 g, $4.23 \times 10^{-3}$ mol). Polymerization was allowed to take place for two hours at a temperature of 40° C., at the end of which time the reaction mixture was treated with a mixture of methanol and water in order to deactivate the catalyst and coagulate the polybutadiene. The polybutadiene was then dried in an oven under vacuum at a temperature of 60° C. for 24 hours.

Two control experiments were also carried out under the same experimental conditions with the exception that in the first control experiment a 1 molar solution of triethyl aluminum in hexane (3.5 g, $5.0 \times 10^{-3}$ mol) was used as the organoaluminum component of the catalyst system while in the second control experiment a 25.3 weight percent solution of trioctyl aluminum in heptane (7.2 g, $5.0 \times 10^{-3}$ mol) was used as the organoaluminum component of the catalyst system.

The polybutadienes thus obtained from the five experiments were analyzed by the aforedescribed methods and the results for the separate experiments are given in Table I.

of triethyl aluminum and tricotyl aluminum added. The resultant solution was then frozen for approximately 30 minutes, 1,3-butadiene (84.0 g, 1.56 mol) was added and polymerization was allowed to take place for 1 hour at a temperature of 40° C. The reactions were stopped and the product polybutadienes isolated and analyzed as in Example 1. The result for the separate experiments are given in Table II.

From the results in Table II it can be seen that even when the method of addition of the various compounds to the reaction mixture is varied the use of a mixture of triethyl aluminum and trioctyl aluminum as the organoaluminum component of the catalyst system instead of triethyl aluminum alone for the polymerization of 1,3-butadiene, results in the amount of wet gel (and dry gel) present in the product high cis-1,4-polybutadiene being reduced.

TABLE II

| Organo-aluminum Mixture | $M_n$ | $M_w$ | DSV | Solids % in soln. | Product wt. in g. | Structure | | | Wet Gel ppm | Dry Gel ppm |
| --- | --- | --- | --- | --- | --- | --- | --- | --- | --- | --- |
| | | | | | | % cis | % trans | % vinyl | | |
| Et$_{2.7}$Oct$_{0.3}$Al | 70,640 | 418,400 | 2.38 | 19.8 | 77.3 | 97.9 | 1.2 | 0.9 | 116 | 116 |
| Et$_2$OctAl | 69,330 | 423,750 | 2.54 | 16.0 | 59.4 | 98.2 | 1.0 | 0.8 | 115 | 100 |
| EtOct$_2$Al | 51,520 | 357,060 | 2.26 | 19.0 | 71.8 | 98.0 | 1.2 | 0.8 | 172 | 165 |
| Et$_3$Al* | 81,010 | 470,060 | 2.54 | 16.0 | 58.2 | 98.2 | 1.0 | 0.8 | 360 | 356 |
| Oct$_3$Al* | 47,810 | 366,290 | 2.20 | 18.1 | 67.7 | 97.8 | 1.4 | 0.8 | — | — |

*Control Experiment

TABLE I

| Organo-aluminum Mixture | $M_n$ | $M_w$ | DSV | Solids % in soln. | Product wt. in g. | Structure | | | Wet Gel ppm | Dry Gel ppm |
| --- | --- | --- | --- | --- | --- | --- | --- | --- | --- | --- |
| | | | | | | % cis | % trans | % vinyl | | |
| Et$_{2.7}$Oct$_{0.3}$Al | 50,970 | 382,490 | 2.18 | 18.2 | 68.3 | 97.9 | 1.6 | 0.5 | 364 | 256 |
| Et$_2$OctAl | 57,580 | 414,640 | 2.18 | 17.4 | 65.3 | 97.6 | 1.9 | 0.5 | 168 | 168 |
| EtOct$_2$Al | 53,130 | 358,590 | 1.89 | 18.3 | 68.6 | 97.3 | 2.1 | 0.6 | 208 | 140 |
| Et$_3$Al* | 56,170 | 438,200 | 2.22 | 17.8 | 66.8 | 98.1 | 1.4 | 0.5 | 748 | 596 |
| Oct$_3$Al* | 45,860 | 318,640 | 1.85 | 15.8 | 59.3 | 97.8 | 1.7 | 0.5 | 448 | 216 |

*Control Experiment

From the results in Table I it can be seen that when a mixture of triethyl aluminum and trioctyl aluminum is used as a component of the catalyst system for the polymerization of 1,3-butadiene instead of either triethyl aluminum or trioctyl aluminum alone that the amount of wet gel present in the product polybutadiene is significantly reduced. Moreover, the microstructure, dilute solution viscosity and amount of polybutadiene produced is substantially the same as that obtained when the organoaluminum catalyst component triethyl aluminum is not mixed with trioctyl aluminum in an appropriate ratio.

EXAMPLE 2

A second series of experiments was carried out using the same compounds for each experiment as in Example 1 but the method of addition of the various compounds was altered. In each experiment a 1 liter glass bottle was charged with the cyclohexane (280 g), a 10 weight percent solution of nickel octanoate in hexane (4.8 g, $1.4 \times 10^{-3}$ mol) and boron trifluoride diethyl etherate (0.6 g, $4.23 \times 10^{-3}$ mol), the resultant solution shaken for 10 minutes and then a solution of the desired mixture

What is claimed is:

1. A process for the production of a high molecular weight rubbery polybutadiene with reduced microgel content having more than 96 percent of the butadiene units present in the cis-1,4-configuration which process comprises the steps of:

(A) polymerizing 1,3-butadiene in a polymerization medium comprising an inert hydrocarbon at a temperature of from about 0° C. to about 120° C. in the presence of a catalyst system dissolved in said polymerization medium, said catalyst system comprising (1) a nickel salt of a carboxylic acid, (2) a mixture of triethyl aluminum and an organoaluminum compound having the formula R$_3$Al, said mixture having an average composition Et$_{3-x}$R$_x$Al wherein Et is an ethyl group, R is an alkyl group having from 8 to 12 carbon atoms and x is a numeral of from about 0.1 to about 2.9 and (3) a boron trifluoride etherate wherein the molar ratio of said nickel salt to said mixture of triethyl aluminum and an organoaluminum compound is from about 1:1 to about 1:20 and the molar ratio of said boron trifluoride etherate to said mixture of triethyl aluminum and an organoaluminum compound is from about 1:0.25 to about 1:2, (B) continuing the polymerization thus initiated to the monomer conversion desired and (C) thereafter deactivating the polymerization and recovering the polybutadiene.

2. The process of claim 1 wherein the nickel salt of a carboxylic acid is selected from the group consisting of nickel benzoate, nickel acetate, nickel naphthenate, nickel octanoate, nickel palmitate and nickel stearate.

3. The process of claim 2 wherein the nickel salt of a carboxylic acid is selected from nickel naphthenate and nickel octanoate.

4. The process of claim 1 wherein the mixture has the average composition $Et_{3-x}R_xAl$ wherein Et is an ethyl group, R is an alkyl group having from 8 to 12 carbon atoms and x is a numeral of from about 0.8 to about 2.8.

5. The process of claim 4 wherein the mixture has the average composition $Et_{3-x}R_xAl$ wherein Et is an ethyl group, R is an alkyl group having 8 carbon atoms and x is a numeral of from about 1 to about 2.7.

6. The process of claim 1 wherein the boron trifluoride etherate is selected from the group consisting of boron trifluoride diethyl etherate, boron trifluoride dipropyl etherate, boron trifluoride diisopropyl etherate, boron trifluoride di-n-butyl etherate, boron trifluoride diisobutyl etherate, boron trifluoride di-n-pentyl etherate, boron trifluoride diisopentyl etherate, boron trifluoride di-n-hexyl etherate and boron trifluoride diisohexyl etherate.

7. The process of claim 6 wherein the boron trifluoride etherate is boron trifluoride diethyl etherate.

8. The process of claim 1 wherein the molar ratio of the nickel salt of a carboxylic acid to the mixture is from about 1:2 to about 1:12.

9. The process of claim 1 wherein the inert hydrocarbon is selected from the group consisting of $C_4$ to $C_8$ aliphatic hydrocarbons and $C_5$ to $C_{10}$ cycloaliphatic hydrocarbons.

10. The process of claim 9 wherein said $C_4$ to $C_8$ aliphatic hydrocarbon is selected from hexane and heptane and said $C_5$ to $C_{10}$ cycloaliphatic hydrocarbon is selected from cyclopentane and cyclohexane.

11. The process of claim 1 which comprise the steps of:

(A) polymerizing 1,3-butadiene in a polymerization medium comprising an inert hydrocarbon at a temperature of from about 0° C. to about 120° C. in the presence of a catalyst system dissolved in said polymerization medium, said catalyst system comprising (1) nickel octanoate, (2) a mixture of triethyl aluminum and an organoaluminum compound having the formula $R_3Al$, said mixture having an average composition $Et_{3-x}R_xAl$ wherein Et is an ethyl group, and R is an alkyl group having 8 carbon atoms and x is a numeral from about 1 to about 2, and (3) boron trifluoride diethyl etherate wherein the molar ratio of said nickel octanoate to said mixture is from about 1:2 to about 1:12 and the molar ratio of said boron trifluoride diethyl etherate to said mixture is from about 1:0.25 to about 1:2, (B) continuing the polymerization thus initiated to the monomer conversion desired and (C) thereafter deactivating the polymerization and recovering the polybutadiene.

* * * * *